United States Patent Office 3,829,368
Patented Aug. 13, 1974

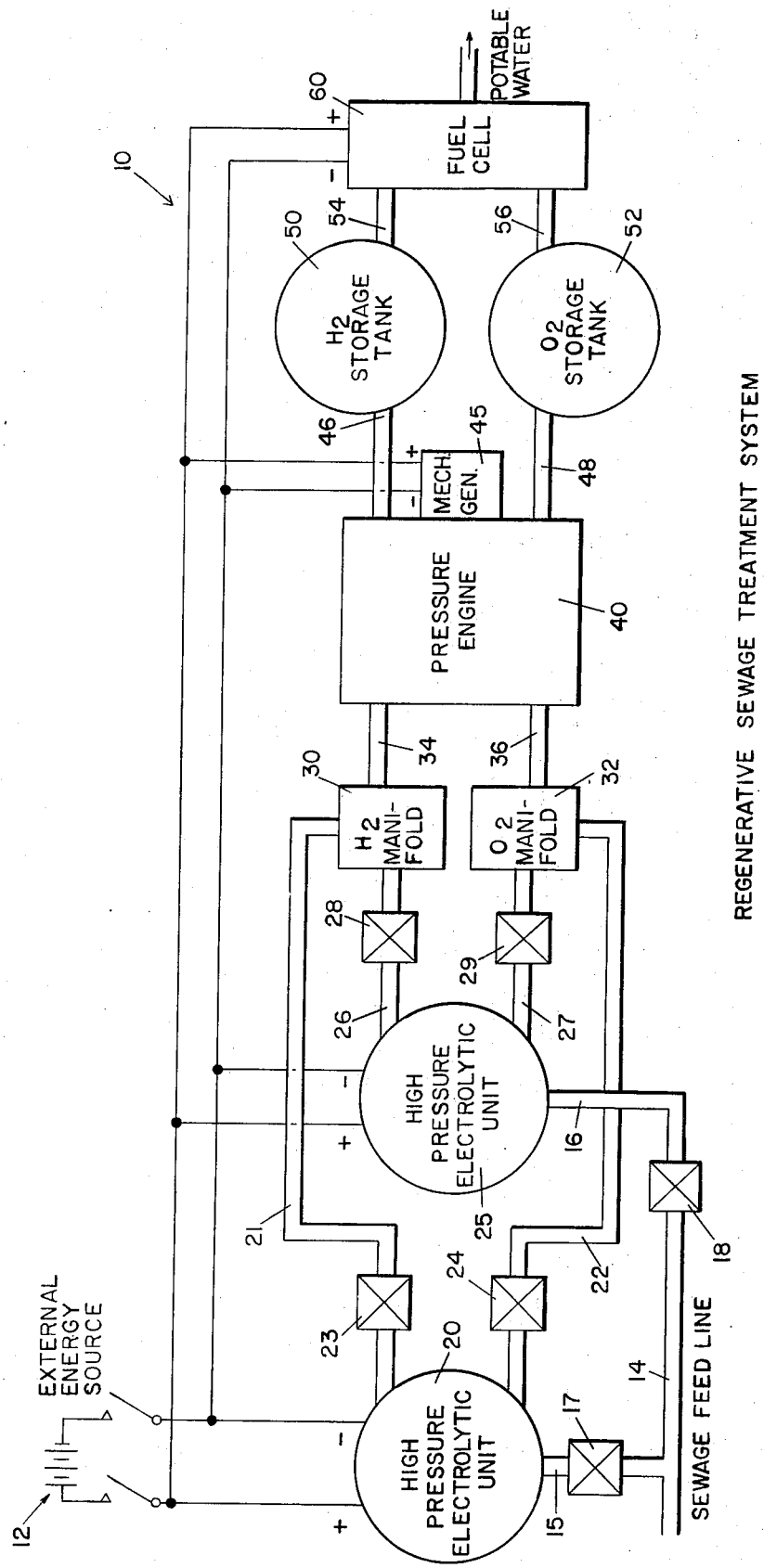

3,829,368
OXYGEN-HYDROGEN GENERATION AND SEWAGE TREATMENT METHOD AND SYSTEM
Robert B. Wesley, 6834 Old Channel Trail,
Montague, Mich. 49437
Filed Mar. 2, 1972, Ser. No. 231,284
Int. Cl. C02b 1/82; C02c 5/12
U.S. Cl. 204—149
37 Claims

ABSTRACT OF THE DISCLOSURE

An apparatus and method comprising a regenerative sewage treatment system for decomposing sewage into its constituent elements, including primarily oxygen and hydrogen gases, under greater than ambient pressures, and, subsequently, utilizing the pressurized elemental gases and the recombination of those element gases to generate sufficient energy to nearly completely sustain the operation of the system and to produce potable water. The system, in the preferred embodiment, includes a high-pressure electrolytic unit for producing pressurized gases of decomposition, a pressure engine and mechanical electrical generator for converting the potential energy of the pressurized gases to kinetic and electrical energy, an oxygen-hydrogen fuel cell for producing potable water and additional amounts of electrical energy, and an external energy source for supplying initial start-up energy and any supplemental energy required.

This invention relates to a method and apparatus for the treatment of sewage and the generation of hydrogen and oxygen and, more particularly, to an apparatus and method for decomposing sewage into its constituent elements of hydrogen and oxygen under pressure, and subsequently utilizing the pressurized elements and the recombination of those elements to regenerate sufficient energy to substantially sustain operation of the system and to produce potable water.

BACKGROUND OF THE INVENTION

The pollution of our natural water courses with organic wastes has become an increasingly serious problem. The natural reduction of community waste products to innocuous forms through hydrolysis, oxidation, and microbial action has long since been proven inadequate. Thus, even with municipal sewage treatment plants in operation, our lakes and streams are becoming increasingly more polluted due to the increases in population and advances in technology accompanied by the attendant increase in water usage. Therefore, it has become apparent that the percentile removal of wastes from our natural water supplies, utilizing present and prior known methods, is inadequate to cope with the pollution problem.

Another method of controlling pollution is to reduce sewage to its constituent elements thereby allowing these elements to be recombined or returned to the environment in a renewed and reusable form.

It has been found that such a reduction of sewage to its element forms is advantageous as a pollution control system from a number of standpoints. First, the chemical composition of organic sewage waste is approximately 97% water. Thus, the primary constituent elements of such sewage waste are oxygen and hydrogen, the basic constituent elements of water. Secondly, hydrogen is an ideal fuel both economically and environmentally since it is (1) non-pollutional, i.e., it may be combined with oxygen to produce water; (2) it is abundant and renewable; and (3) it is economically feasible to produce. Thirdly, hydrogen may be most efficiently obtained by the electrolytic decomposition of water since electrolysis has been found to be the most efficient way to break the molecular bond of water, and hydrogen is most abundantly available in the form of water. Finally, it is well known that the recombination of hydrogen and oxygen to produce water is an exothermic reaction, meaning that nearly all of the energy required to decompose water originally may be recovered upon the recombination of its constituent elements.

In the past, various separate methods have been proposed for the reduction of water sewage to its constituent elements and also for the recombination of oxygen and hydrogen to produce water. However, none of the existing methods have been utilized to produce a practical and efficient system based upon the above-described principle of the reduction of sewage to its constituent elements followed by the recombination and reinsertion of those constituent elements into the environment in a purified form.

SUMMARY OF THE INVENTION

Accordingly, it is an object and feature of the present invention to provide a regenerative sewage treatment system which is capable of decomposing sewage into its constituent elements and using those elements to both produce purified water and sufficient energy to provide nearly all the energy required to operate the system.

Another object is to provide a regeneration system capable of forming purified water from elemental hydrogen and oxygen gases while creating energy to operate the system in recycling fashion.

It is another object and feature of the present invention to provide a regenerative sewage treatment system using an external start-up energy source to initiate the operation of the system and subsequently, will require only minimal amounts of energy supplied from the external source.

It is a further object and feature of the present invention to provide a regenerative sewage treatment system which is capable of adaptation to either small individual dwelling units or to large municipal waste treatment systems.

It is yet another object and feature of the present invention to provide a regenerative sewage treatment system which is simply constructed, efficient and non-pollutional in operation, yet which is extremely inexpensive to operate.

These and other objects and features of the present invention may be accomplished by providing a regenerative sewage treatment system comprising at least two pressurized electrolytic decomposition units for the reduction of sewage effluents to their constituent elements at greater than ambient pressure, a pressure engine for conversion of the potential energy of the constituent elements formed at greater than ambient pressure to kinetic energy, a mechanical generator for converting the kinetic energy to electrical energy, a chemical reaction and energy recovery means for converting the constituent elements to water and electrical energy by means of a chemical reaction, and an external energy means for supplying starting and minimal amounts of additional electrical energy to the system.

The system is adapted to first decompose the sewage effluent to their constituent elements in the pressurized electrolytic cells. The sewage effluents are preferably primarily treated prior to this decomposition. The constituent elements, including mainly oxygen and hydrogen gases, are captured in their pressurized state and transported to a pressure engine which converts the potential energy of the pressurized gases to kinetic energy. This kinetic energy is utilized by a mechanical electrical generator to produce approximately 15 percent of the energy required to operate the system. The depressurized hydrogen and oxygen gases are then transported to the chemical reaction and energy recovery means, comprising an oxygen-hydrogen fuel cell in the preferred embodiment of the system, which recombines the elements into potable water and recovers an amount of usable energy. The recombination takes place in an exothermic chemical reaction which produces approximately 85 percent of the electrical energy required to operate the electrolytic units. An external energy source is provided to supply any additional electrical energy needed to operate the system due to the various inefficiencies encountered in the operation of the system. However, in order to minimize the amount of energy required from the external energy source, the pressure of the electrolytic units may be varied to increase the amount of potential energy which may be converted by the pressure engine to produce additional amounts of energy.

These and other objects, advantages, and features of the invention will become apparent from a study of the following description taken in conjunction with the drawings.

BRIEF DESCRIPTION OF THE DRAWINGS

The figure provided herewith is a schematic drawing of the preferred embodiment of the present invention.

GENERAL SYSTEM DESCRIPTION

Generally, the theoretical formulation of the present invention is based on three scientific principles which, in combination, form the basis for the construction of a regenerative sewage treatment system which is nearly completely self-sustaining in operation. It is known that the bonds of the individual molecules of water may be broken by the application of heat energy. Thus, for example, the application of 69,000 calories of heat energy to 18.016 grams of water will decompose that amount of water into 2.016 grams of hydrogen and 16 grams of oxygen. The Law of the Conservation of Mass indicates that 2.016 grams of hydrogen and 16 grams of oxygen may be recombined to produce 18.016 grams of water. Similarly, the Law of Conservation of Energy reveals that the amount of energy applied during the endothermic reaction of decomposition will be released during the exothermic reaction of recombination of water. Consequently, it is theoretically possible to recover all of the energy used in the decomposition of the water molecule into its constituent elements, namely, hydrogen and oxygen atoms, by the process of recombination.

It is also known that water may be electrolytically decomposed into its constituent elements through the application of a definitive amount of electrical energy as determined from Faraday's Law. Faraday's Law states that the weight of a given element liberated at an electrode during electrolysis is directly proportional to the quantity of electricity passed through the electrolyte solution. Accordingly, the passage of a specific amount of electricity through water in the process of electrolysis will produce a specific amount of hydrogen and oxygen at the electrodes, i.e., the cathode and anode, respectively. Thus, for example, the passage of one faraday, or 26.8 ampere hours of electric current, through the electrolyte, or water, will result in the release of one gram of hydrogen at the cathode and 8 grams of oxygen at the anode. Again applying the Law of Conservation of Energy, the recombination of hydrogen and oxygen to form water will release a specific amount of electrical energy equal in amount to that originally required to produce the decomposition. Thus, in the example, the recombination of one gram of hydrogen and 8 grams of oxygen will produce on faraday, or 26.8 ampere hours of electrical energy.

It will be apparent, then, that theoretically, it is possible to produce a self-sustaining reaction utilizing known scientific laws and electrolysis for the decomposition and recombination of water. However, it is also readily apparent that the practical, operational values cannot reach the theoretical values due to the inherent losses encountered during the conversion of the theoretical process to an operational and pragmatic system. These losses include those from heat generation and various other inefficiencies in methods and equipment.

It is also known that electrolytic decomposition may be used to decompose sewage into its constituent elements since, generally, sewage is composed of approximately 97 percent water. The electrolytic decomposition of water followed by the recombination of the oxygen and hydrogen obtained therefrom, accomplishes an almost total removal of all forms of pollutional matter including bacterial contamination. This nearly 100 percent purification of the liquid effluent composing sewage has been verified with experimentation consisting of the decomposition of effluents collected from a municipal primary sewage treatment plant. The effluent was placed in a small laboratory electrolytic cell fitted with flat plate copper electrodes, glass headers, a cap, and nylon tubing. Power was supplied by a 30 amp DC rectifier with variable voltage and ampere output controls. A one-liter sample of primary effluent, to which 100 cubic centimeters of sulfuric acid, an ionizable substance, were added to increase the conductivity of the electrolyte, was placed in the cell and decomposed into its constituent gases after an initial settling period of 12 hours. The electric current supplied was 2.6 volts at 30 amperes. The gases of decomposition were separately collected and piped to an oxy-hydrogen blow pipe fitted beneath a bell jar which in turn was suspended over a collecting beaker. The oxygen and the hydrogen were burned in the blow pipe forming water vapor which was condensed within the bell jar and collected in the beaker. The following water chemistry and bacteriology analysis parameters were obtained before and after the decomposition and recombination of the sewage effluents. Note that these parameters were obtained in the above experiment with sewage effluents which had been primarily treated by means of settling and chlorination. Effluent measurement prior to decomposition:

Water Chemistry

| Parameter: | Concentration (in milligrams/liter) |
|---|---|
| 5-day BOD (biochemical oxygen demand) | 100.0 |
| Suspended solids | 80.0 |
| Suspended volatile solids | 72.1 |
| Settleable solids | 34.0 |
| Organic nitrogen | 3.6 |
| Ammonia nitrogen ($NH_3$-N) | 0.0 |
| Nitrate nitrogen ($NO_3$-N) | 24.2 |
| Soluble ortho phosphates | 38.0 |
| Total phosphates | 38.0 |

Bacteriology

| | Most probable number (MPN) per 100 milliliters |
|---|---|
| Total coliform (designating both types of bacilli found in intestinal tracts of warm-blooded mammals and in other natural sources) | 2300 |

Water measurements subsequent to decomposition and recombination:

Water Chemistry

| Parameter: | Concentration (in milligrams/liter) |
|---|---|
| 5-day BOD | 0.0 |
| Suspended solids | 0.0001 |
| Suspended volatile solids | 0.0 |
| Settleable solids | 0.0 |
| Organic nitrogen | 0.0 |
| Ammonia nitrogen ($NH_3$-N) | 0.0 |
| Nitrate nitrogen ($NO_3$-N) | 0.0 |
| Soluble ortho phosphates | 0.0 |
| Total phosphates | 0.0 |

Bacteriology

| | MPN/100 ml. |
|---|---|
| Total coliform | 0.0 |

As indicated by these ten normal sewage treatment tests, which are indicative of the chemical and bacteriological pollution of the water prior to and after treatment, the electrolysis of primary sewage effluent is nearly 100 percent efficient in purifying and converting liquid sewage effluents to potable water. The practical ability of electrolysis to effectively treat municipal waste water is thereby established.

Having established the experimental efficiency of the electrolysis to treat sewage effluents, the present invention was conceived to overcome the practical and operational energy lossses encountered in the actual operation of a sewage treatment system including at least two electrolytic decomposition units in combination with a chemical reaction and energy recovery means for recombining the elemental gases of decomposition into potable water and usable electrical energy. The practical difficulties were overcome by utilizing a flexible source of recoverable energy based on the principle that electrolysis can proceed unimpeded at increased atmospheric pressures. Thus, operating the electrolytic unit at increased pressures enables the collection of pressurized hydrogen and oxygen having a potential energy which may be converted into an additional amount of energy for use in operating the system. Depending upon the various inefficiencies involved in operating the system, the pressure of the electrolytic cell may be increased to a maximum of 200 atmospheres, or 2,940 pounds per square inch, thereby providing a flexible source of potential energy for conversion into an additional amount of electrical energy needed to replace the energy lost through the various inefficiencies. Consequently, the apparatus, more fully described below, was devised to utilize the above discussed novel concept.

DESCRIPTION OF THE PREFERRED EMBODIMENT

Referring now to the figure, the construction of the novel apparatus utilizing the above concept will be more fully understood. The apparatus comprises a regenerative sewage treatment system 10 including a first and second high-pressure electrolytic means or units 20 and 25, respectively. These electrolytic units are connected in parallel to collecting manifolds 30 and 32 and thence to at least one pressure engine 40 which is adapted to drive a mechanical electrical generator 45. The remainder of the apparatus comprises separate storage tanks 50 and 52 for the gases of decomposition which have been depressurized in the pressure engine 40. These storage tanks may be utilized to store the gases for later use in a chemical reaction and energy recovering means such as an oxygen-hydrogen fuel cell 60. As will be more fully described hereinafter, the pressure engine 40 and mechanical electrical generation means 45 generate approximately 15 percent of the required electrical energy needed to operate the system 10, and chemical reaction and energy recovery means or fuel cell 60 supply approximately 85 percent of the required operational electrical energy. An external energy or voltage source 12 is provided for the initial start-up of the sewage system 10 and to provide any additional or supplemental amounts of energy needed for the operation of the system.

The primary units for the system comprise the high-pressure electrolytic cells 20 and 25. Sewage is either pumped or gravitationally fed through lines 14, 15, and 16, and valves 17 and 18, alternately during the operation of the system. Preferably, the sewage fed to the units 20 and 25 has been primarily treated by settling in either septic tanks in smaller scale or home installations or oxidation ponds or primary settlement systems for larger installations such as industrial and municipal applications. The primary treatment thus removes the majority of the solid portion of the sewage effluent leaving a remainder composed of primarily liquid sewage effluents.

The electrolytic units 20 and 25 each include at least one cathode and one anode for input of electrical energy into the electrolyte comprising the liquid sewage effluents. The high-pressure units are any one of several types of high-pressure electrolyzers which are presently commercially available and can operate at pressures to a maximum of 200 atmospheres, or 2,940 p.s.i. The optimum operating pressure for these type of high pressure electrolyzers has been found to be approximately 150 atmospheres, or 2,205 p.s.i. at about 39° centigrade (C.). It has been found that in the electrolytic decomposition of liquids, liberated gas bubbles are formed at the cathode and anode and increase the electrical resistance of the electrolyte. However, at the increased pressure utilized in the high-pressure electrolytic units, the volume of these gas bubbles is reduced, thereby lowering the electrolyte resistance. Similarly, the polarization due to the bubbles that adhere to the electrodes is reduced as the pressure is increased. Therefore, the combination of these factors serves to reduce the required electrode voltage in pressurized electrolytic units proportionally with the rise in pressure. Consequently, the actual energy required to produce the gases of decomposition at normal and higher pressure is generally less than the energy required at lower pressure. Operational data on the several available high-pressure electrolyzers on the market today indicates that efficiencies approaching 100 percent are possible with proper electrolytes and operating conditions. Therefore, it is apparent that the theoretical values for at least the electrolytic units are nearly attainable in actual operation.

Two high-pressure electrolytic units are provided in the preferred embodiment. The use of two units allows the sewage feed line 14 to be used to fill one electrolytic unit while the other is operating to decompose the liquid sewage effluents. Thus, one unit may be depressurized and filled while the other unit is functioning thereby maintaining the continuous operation of the system.

Each of the electrolytic units 20 and 25 includes gas transportation means or connecting lines or conduits and valves for transporting the pressurized constituent elements of the sewage effluent, namely, hydrogen and oxygen gases, with traces of other gases from other substances also contained in the sewage, to the pressure engine means 40. Electrolytic unit 20 includes transporting lines 21 and 22 including valves 23 and 24 for controlling the flow of the gases therethrough. Electrolytic unit 25 include gas transporting lines 26 and 27 including valves 28 and 29. The electrolytic units 20 and 25 are connected in parallel by means of lines 21, 22, 26 and 27 to separate collecting manifolds 30 and 32, manifold 30 collecting the pressurized hydrogen gases, and manifold 32 collecting the pressurized oxygen gases. The manifolds 30 and 32 collect and feed the oxygen and hydrogen gases separately through lines 34 and 36 respectively to pressure engine means 40.

Pressure engine means 40 which is the second step in the operation of the sewage treatment system, comprises a variable source for converting the potential energy of the pressurized gases to kinetic energy which may then be used to generate the electrical energy with mechanical electrical generation means 45. Since it is essential to the operation of the system that the two gases are kept separate and isolated from each other at this point, the pressure engine necessarily includes two banks of cylinders of a varying volume (not shown) connected to a common output shaft (not shown). Each cylinder includes a piston which is driven by the gas expanding within the cylinder, each piston being connected to the common shaft. The common shaft is in turn connected to the mechanical electrical generator 45 which may be one of several commercially available types. The generator 45 converts the kinetic energy of the output shaft to electrical energy utilized for the operation of the system 10. When the system is used with a fuel cell 60, the mechanical or electric generator 45 will normally be required to produce only approximately 15 percent of the required operational energy for the system. Such fuel cells are presently available with efficiencies up to 85 percent. However, as will be more fully explained below, should other inefficiencies develop within the system, the pressure on the electrolytic units may be increased to develop a greater potential energy in the gases of decomposition, thereby allowing the pressure engine 40 to produce a greater amount of kinetic energy which may be converted to a greater amount of electrical energy by mechanical generator 45.

Although in the preferred embodiment a reciprocating piston pressure engine is utilized, it will be understood that other pressure engines such as turbine and rotary type engines may be used as well without deviating from the spirit of the invention.

Following the depressurization of the gases of decomposition in pressure engine 40, the gases may be transported separately to separate storage tanks 50 and 52 for hydrogen and oxygen respectively by means of gas transporting lines 46 and 48. Storage tanks 50 and 52 are provided in the event that the production of gases and conversion of potential to kinetic energy of those gases takes place at a faster rate than that of the operation of the chemical reaction and energy recovery means such as fuel cell 60. However, normally the regenerative system 10 will utilize the normal production of oxygen and hydrogen continuously without need for intermediate storage. The storage tanks may be controlled to feed a predetermined amount of depressurized gases to the fuel cell or other energy recovery means by means of transporting lines 54, 56.

The final or third step in the preferred embodiment of the sewage treatment system 10 comprises a chemical reaction and energy recovery means such as oxygen-hydrogen fuel cell 60. Fuel cell 60 may be one of several types of commercially available fuel cells with efficiencies of up to 85 percent, i.e., recovery of approximately 85 percent of the energy utilized to operate them. The basic operation of the fuel cell 60 is to chemically react i.e. "burn" the hydrogen and oxygen fed thereto from storage tanks 50 and 52 thereby producing both a quantity of electrical energy and a quantity of water formed from the recombination of the constituent elements thereof. As described in the above experiment, the resulting water is nearly 100 percent purified and contains almost none of the impurities present in the original liquid sewage effluent. Thus, the fuel cell produces completely potable water.

Should the fuel cell be impractical in certain applications other chemical reaction and energy recovery means may be substituted therefor in the sewage treatment system 10. Thus, a gas turbine engine and an associated electrical generator may be substituted, as well as other internal combustion engines in combination with an electrical generator. Other chemical reaction and heat exchanging means which can recover the energy produced in the exothermic reaction utilized to recombine the hydrogen and oxygen into potable water may be used in the system in place of the preferred fuel cell. The lower efficiencies of the unit substituted for the fuel cell, such as the gas turbine and combined generator, may be compensated for by an increase in the pressure of the electrolytic unit, thereby allowing the pressure engine 40 and mechanical electrical generator 45 to produce a greater amount of electrical energy to meet the needs of the system as a whole.

Both the mechanical electrical generator 45 and fuel cell or other chemical reaction and energy recovery means 60 are connected electrically in series to the high-pressure electrolytic units 20 and 25 to provide operating energy therefor. The external energy source 12, which provides the initial start-up energy for the production of gases of decomposition in electrolytic units 20 and 25, is also connected in series in order to provide additional minimal amounts of electrical energy should the pressure engine, mechanical generator, and fuel cell be unable to provide 100 percent of the necessary operating electrical energy required by the sewage treatment system 10.

The operation of the regenerative sewage treatment system 10 will now be explained. Sewage effluents which have been given a primary treatment are fed through feed lines 14 alternately to high-pressure electrolytic units 20 and 25. The high-pressure electrolytic units decompose the liquid or water portion of the sewage effluents into the gasses of decomposition which are primarily hydrogen and oxygen plus a small percentage of contaminant gases. The gases in their pressurized state are collected separately and transported to a pressure engine 40 having separate cylinders for the expansion and conversion of the potential energy of the pressurized gas to kinetic energy which is transferred to a common output shaft. The common output shaft drives mechanical electrical generator 45 which, in the preferred embodiment of the system 10, produces approximately 15 percent of the required electrical energy for the system. After the gases of decomposition have been depressurized in pressure engine 40, they are fed through storage tanks 50 and 52 into a chemical reaction and energy recovery means such as fuel cell 60. Fuel cell 60 recombines the depressurized hydrogen and oxygen in an exothermic chemical reaction to produce potable water and electrical energy, which energy supplies approximately 85 percent of the necessary operating energy required by system 10. The system 10 is initially operated by means of an external energy source 12 until sufficient gases of decomposition are collected and utilized by pressure engine 40, mechanical generator 45, and fuel cell 60 to produce enough electrical energy to sustain the operation of the system. Additional minimal amounts of electrical energy may also be provided by source 12 during the operation of the system 10 to accommodate for any inefficiencies or energy losses encountered therein.

The quantitative analysis of the operation of the regenerative sewage treatment system 10 is illustrated in the following example.

EXAMPLE

A theoretic energy balance for the system including the pressure engine may be computed, as follows:

|  | Percent |
|---|---|
| Fuel cell potential recovery | 85 |
| Pressure engine and generator potential recovery | 15 |
| Total | 100 |

Validation of the calculated values of the system is demonstrated by combining known operational characteristics of the component units. The typical high-pressure electrolyzer will produce 1 gram of hydrogen and 8 grams of oxygen for every 26.8 ampere hours of electrical energy; therefore, the following system energy balance may be obtained:

Primary stage:
  Unit: High pressure electrolyzer
  Material for decomposition: Sewage (pretreated)
  Energy input: 161 kwh.—D.C. low voltage (2.3 volts), high amperage
  Products of decomposition (approximately): 2,630 grams $H_2$; 20,900 grams $O_2$
  Volume: 1,030 cu. ft. $H_2$
  (At Standard condition.— 0° C. 760 mm. Hg): 512 cu. ft. $O_2$
  Volume at 450 p.s.i. to 39° C. $\begin{cases} 38 \text{ cu. ft. } H_2. \\ 18.9 \text{ cu. ft. } O_2. \end{cases}$ 56.9 cu. ft. $H_2$ and $O_2$.

(Boyle and Gay Lussac's Laws applied to calculate volume at higher temperature and pressure)

Secondary stage:
  Unit: Pressure engine and generator
  Source of energy: 56.9 cu. ft. gases at 450 p.s.i.
  Power formula: PANX/33,000=H.P./cylinder=4 horsepower per cylinder
    P (pressure)=450 p.s.i.
    A (area of piston surface)=3 sq. in.
    N (number of strokes/min.)=400
    X (length of strokes)=.25 ft.=3 inches
  8 cylinders=32 H.P.
  Conversion: 32 H.P.=24 kwh.
Tertiary stage:
  Unit: Hydrogen—Oxygen fuel cell
  Source of energy: 2,630 grams $H_2$ and (recombination) 20,900 grams $O_2$
  Energy formula:
    1 gram $H_2 \rightarrow 8$ grams $O_2$=26.8 ampere hours ×2.3 volts
    ∴ 2,630→20,900=161,000 watt-hours=161 k.w.h.
    Less 15% efficiency loss=145 kwh.

ENERGY BALANCE FOR TOTAL SYSTEM

| Input (Energy for electrolysis) | Output (Energy recovery from components) |
|---|---|
| 161 kwh. | Pressure engine____ 24 kwh. |
| 8 kwh. (5% overage). | Fuel cell_____ 145 kwh. |
| Total___ 169 kwh. | Total_____ 169 kwh. |

The 5% overage in energy requirements could arise from increased energy demand in the primary stage or electrolytic units due to line loss, over voltage from conditions in the electrolyte, electrode corrosion, etc. However, because of the flexibility of the high-pressure electrolyzers wherein pressures up to 200 atmos. may be maintained with little or no increase of the energy required to operate them, a state of balanced regeneration is possible with the additional energy produced by the pressure engine and generator at the higher pressure and with minimal amounts of energy added from the external source.

It will now be understood that the regenerative sewage treatment system 10 comprises a system for the decomposition of liquid sewage effluents under pressure, the conversion of the pressure of the gases of decomposition into kinetic and electrical energy, and the recombination of the gases of decomposition into potable water and an additional amount of electrical energy. In this combination, the regenerative system 10 is basically a self-sustaining system and therefore very economical in operation, since it requires only minimal amounts of energy supplied from an external source to sustain its operation. It will also be apparent that the system may be scaled to accommodate the needs of either small dwellings or large municipal and industrial applications.

It should also be understood that the high-pressure electrolytic units may be used in combination with the pressure engine and mechanical generating means to reduce liquid sewage effluents to their constituent elements under pressure and to produce an amount of electricity which can supply a portion of the operating energy for the decomposition process. The gases of decomposition may then be transported to storage tanks for further use as desired by the operator of the system. In this form, the system will not be self-sustaining, but will be an economical system for the reduction of sewage, and the generation of electrical energy and hydrogen and oxygen gases.

Either form of the system eliminates the chemical and bacteriological pollution of the sewage effluents nearly 100 percent efficiently. Additionally, indications are that the viral contamination of the effluents is also eliminated.

While several forms of the invention have been shown and described, other forms, will now be apparent to those skilled in the art. Therefore, it will be understood that the embodiments shown in the drawing and described above are merely for illustrative purposes, and are not intended to limit the scope of the invention which is defined by the claims which follow.

The embodiments of the invention in which an exclusive property or privilege is claimed are defined as follows:

1. A method for the regenerative treatment of sewage reaction and energy recovery comprising the steps of:
   (1) pretreating said sewage to remove the majority of the solid portions of said sewage;
   (2) decomposing said pretreated sewage into constituent gaseous elements under elevated pressure;
   (3) collecting said pressurized constituent gaseous elements;
   (4) converting the potential energy of said pressurized gaseous elements to kinetic energy with pressure engine means by expanding and depressurizing said gaseous elements;
   (5) generating electrical energy from said kinetic energy;
   (6) chemically recombining said depressurized constituent elements and obtaining electrical energy and water therefrom;
   (7) recycling said electrical energy to decompose additional sewage; and
   (8) supplying supplemental electrical energy needed for the continuous decomposition of additional sewage.

2. A method in accordance with claim 1 wherein said decomposing step is accomplished electrolytically.

3. A method in accordance with claim 2 wherein said depressurized constituent elements are stored prior to said chemical recombination.

4. A method in accordance with claim 3 wherein an ionizable substance is used during said electrolytic decomposition in order to facilitate said decomposition.

5. A method in accordance with claim 3 wherein said pretreating is accomplished by holding said sewage and allowing said solid portions to settle-out.

6. A method in accordance with claim 5 wherein said decomposing step comprises separating said pretreated sewage into pressurized and compressed hydrogen and oxygen gases, and other gases present in small percentages.

7. A method in accordance with claim 6 wherein said separation is performed at pressures between about 14.7 and 2,940 p.s.i., with optimum pressure being about 2,205 p.s.i. at about 39° C.

8. A method in accordance with claim 6 wherein said converting step comprises separately expanding and depressurizing said constituent elements in at least two pressure engine means.

9. A method in accordance with claim 8 wherein said step of chemically recombining said depressurized constituent elements comprises recombining said hydrogen and oxygen gases in an oxygen-hydrogen fuel cell by means of an exothermic chemical reaction, said reactions generating a portion of the electricity needed for continuous operation of said system and producing potable water.

10. A water treatment system comprising in combination:
   (1) pressurized decomposition means for the reduction of water to its constituent elemental gases at greater than ambient pressures;
   (2) pressure engine means for conversion of the potential energy of said constituent elemental gases which remain at greater than ambient pressures to kinetic energy;
   (3) mechanical electrical generation means for converting said kinetic energy to electrical energy; and
   (4) external energy means for supply starting and additional electrical energy to said system;
said mechanical electrical generation means and said external energy means providing sufficient electrical energy to sustain the continuous operation of said system.

11. A system in accordance with claim 10 wherein said system is regenerative and further includes a chemical reaction and energy recovery means for converting said constituent elemental gases to water and electrical energy by means of chemical reaction, said pressure engine means, mechanical electrical generation means and chemical reaction and energy recovery means supplying the majority of the required electrical energy for the continuous operation of said system while said external energy means supplies a minority of said required electrical energy.

12. Apparatus in accordance with claim 11 wherein said pressurized decomposition means comprises at least two pressurized electrolytic units, said units each including at least one cathode and at least one anode, with said water being the electrolyte, said electrolyte conducting said electrical energy between said cathode and anode such that said water is decomposed into hydrogen, oxygen and other gases at said cathode and anode, said gases being pressurized and compressed due to the pressurization of said electrolytic units, said units adapted to be alternately filled and operated such that said system may be continuously operated without shutting down during filling periods.

13. Apparatus in accordance with claim 12 wherein said pressure engine means comprises at least two cylinders driven by said pressurized and compressed hydrogen and oxygen gases, one cylinder utilizing hydrogen and the other cylinder utilizing oxygen, said cylinders in turn operably connected to said mechanical generating means.

14. Apparatus in accordance with claim 13 wherein said mechanical electrical generation means comprises an electrical generator which is driven by said pressure engine, said electrical generator producing a portion of the electricity required to sustain the operation of said system after said operation has been started initially.

15. Apparatus in accordance with claim 14 wherein said chemical reaction and energy recovery means comprises an oxygen-hydrogen fuel cell, said fuel cell producing a portion of the electricity required to sustain the operation of said system after said operation has been started initially, and producing a quantity of potable water, said production of electricity and potable water being accomplished by an exothermic chemical reaction which recombines said oxygen and hydrogen gases from said electrolytic unit.

16. A regenerative sewage treatment system comprising in combination:
(a) pressurized decomposition means for the reduction of sewage effluents to their constituent elemental gases of decomposition which remain at greater than ambient pressures;
(b) pressure engine means for conversion of the potential energy of said constituent elemental gases which remain at greater than ambient pressures to kinetic energy;
(c) mechanical electrical generation means for converting said kinetic energy to electrical energy;
(d) chemical reaction and energy recovery means for converting said constituent elemental gases to water and electrical energy by means of chemical reaction; and
(e) external energy means for supplying starting and additional electrical energy to said system;
said pressure engine means, mechanical electrical generation means, and chemical reaction and energy recovery means supplying the majority of the required electrical energy for the continuous operation of said system while said external energy means supplies a minority of said required electrical energy.

17. A system in accordance with claim 16 wherein said system further includes a sewage pretreatment means for pretreating said sewage prior to the treatment by said system.

18. A system in accordance with claim 17 wherein said sewage pretreatment means comprises apparatus for allowing the primary settling-out of the majority of the solid portions of said sewage effluents and chlorinated of the effluents.

19. A system in accordance with claim 17 wherein said pressurized decomposition means comprises at least two pressurized electrolytic units, said units each including at least one cathode and at least one anode, with said pretreated sewage being the eletctrolyte, said electrolyte conducting said electrical energy between said cathode and anode such that said sewage is decomposed into hydrogen, oxygen and other gases at said cathode and anode, said gases being pressurized and compressed due to the pressurization of said electrolytic units, said units being alternately filled and operated such that said system may be continuously operated without shutting down during filling periods.

20. A system in accordance with claim 19 wherein said system further includes collection and transportation means for separately collecting said pressurized gases from said electrolytic units and transporting said gases to said pressure engine means.

21. A system in accordance with claim 20, wherein the electrolyte includes an ionizable substance to increase the electrical conductivity thereof.

22. A system in accordance with claim 20 wherein said pressure engine means comprises at least two cylinders driven by said pressurized and compressed hydrogen and oxygen gases, one cylinder utilizing hydrogen and the other cylinder utilizing oxygen, said cylinders in turn operably connected to said mechanical generation means.

23. A system in accordance with claim 22 wherein said mechanical electrical generation means comprises a first electrical generator driven by said pressure engine, and said chemical reaction and energy recovery means comprises an internal combustion engine in combination with a second electrical generator.

24. A system in accordance with claim 22 wherein said mechanical electrical generation means comprises an electrical generator which is driven by said pressure engine, said electrical generator producing a portion of the electricity required to sustain the operation of said system after said operation has been started initially.

25. A system in accordance with claim 24 wherein said chemical reaction and energy recovery means comprises an oxygen-hydrogen fuel cell, said fuel cell producing a portion of the electricity required to sustain the operation of said system after said operation has been started initially, and producing a quantity of potable water, said production of electricity and potable water being accomplished by an exothermic chemical reaction which recombines said oxygen and hydrogen gases from said electrolytic unit.

26. A system in accordance with claim 25 wherein said system further includes separate storage tanks for said oxygen and hydrogen gases between said electrical generator and said fuel cell such that said gases may be stored for future use in said fuel cell.

27. A system in accordance with claim 26 wherein said external energy means comprises a voltage source connected in series with mechanical electrical generation means and said chemical generation means.

28. A system for the treatment of sewage comprising in combination:
(a) pressurized decomposition means for the reduction of sewage effluents to their constituent elemental gases at greater than ambient pressures;
(b) pressure engine means for conversion of the potential energy of said constituent elemental gases which remain at greater than ambient pressures to kinetic energy;
(c) mechanical electrical generation means for converting said kinetic energy to electrical energy; and
(d) external energy means for supplying starting and additional electrical energy to said system;

said mechanical electrical generation means and said external energy means providing sufficient electrical energy to sustain the continuous operation of said system.

29. A system in accordance with claim 28 wherein said system further includes a sewage pretreatment means for pretreating said sewage prior to the treatment by said system.

30. A system in accordance with claim 29 wherein said sewage pretreatment means comprises apparatus for allowing the primary settling-out of the majority of the solid portions of said sewage effluents and chlorination of the effluents.

31. A system in accordance with claim 29 wherein said pressurized decomposition means comprises at least two pressurized electrolytic units, said units each including at least one cathode and at least one anode with said pretreated sewage being the electrolyte, said electrolyte conducting said electrical energy between said cathode and anode such that said sewage is decomposed into hydrogen, oxygen and other gases at said cathode and anode, said gases being pressurized and compressed due to the pressurization of said electrolytic units, said units adapted to be alternately filled and operated such that said system may be continuously operated without shutting down during filling periods.

32. A system in accordance with claim 31 wherein said system further includes collection and transportation means for separately collecting said pressurized gases from said electrolytic unit and transporting said gases to said pressure engine means.

33. A system in accordance with claim 32 wherein the electrolyte includes an ionizable substance to increase the electrical conductivity thereof.

34. A system in accordance with claim 33 wherein said pressure engine means comprises at least two cylinders driven by said pressurized and compressed hydrogen and oxygen gases, one cylinder utilizing hydrogen and the other cylinder utilizing oxygen, said cylinders in turn operably connected to said mechanical generation means.

35. A system in accordance with claim 34 wherein said mechanical electrical generation means comprises an electrical generator which is driven by said pressure engine, said electrical generator producing a portion of the electrical energy required to operate said system.

36. A system in accordance with claim 35 wherein separate storage tanks for said oxygen and hydrogen gases are provided after expansion in said pressure engine means.

37. A system in accordance with claim 36 wherein said external energy means comprises a voltage source connected in series with said mechanical electrical generation means.

References Cited

UNITED STATES PATENTS

| | | | |
|---|---|---|---|
| 2,384,463 | 9/1945 | Gunn et al. | 204—Dig. 4 |
| 3,180,813 | 4/1965 | Wasp et al. | 204—Dig. 4 |

HOWARD S. WILLIAMS, Primary Examiner

A. C. PRESCOTT, Assistant Examiner

U.S. Cl. X.R.

204—Dig. 3, Dig. 4, 278